(12) United States Patent
Yen

(10) Patent No.: US 7,341,442 B2
(45) Date of Patent: Mar. 11, 2008

(54) MOLD FOR MOLDING LENSES

(75) Inventor: Shih-Chieh Yen, Tu-Cheng (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 0 days.

(21) Appl. No.: 11/433,245

(22) Filed: May 12, 2006

(65) Prior Publication Data
US 2007/0116796 A1  May 24, 2007

(30) Foreign Application Priority Data
Nov. 18, 2005 (TW) .................................. 94140612

(51) Int. Cl.
*B29D 11/00* (2006.01)
(52) U.S. Cl. ...................... 425/394; 425/397; 425/808; 65/286
(58) Field of Classification Search ................ 425/325, 425/378.1, 381, 409, 411, 419, 414–416, 425/503, 394, 397, 808; 65/314, 319, 306, 65/307, 374.1, 286
See application file for complete search history.

(56) References Cited

U.S. PATENT DOCUMENTS

| | | | | |
|---|---|---|---|---|
| 4,629,489 A | * | 12/1986 | Hirota et al. ................. | 65/102 |
| 4,778,505 A | * | 10/1988 | Hirota et al. ................. | 65/102 |
| 5,173,100 A | * | 12/1992 | Shigyo et al. ................ | 65/102 |
| 5,380,349 A | * | 1/1995 | Taniguchi et al. ............ | 65/286 |
| 5,762,676 A | * | 6/1998 | Richards et al. ............. | 65/102 |
| 6,629,435 B2 | * | 10/2003 | Tomisaka .................... | 65/102 |

FOREIGN PATENT DOCUMENTS

WO  WO97/15437  5/1997

* cited by examiner

*Primary Examiner*—Yogendha N. Gupta
*Assistant Examiner*—Dimple N. Bodawala
(74) *Attorney, Agent, or Firm*—Jeffrey T. Knapp

(57) ABSTRACT

An exemplary mold for molding lenses includes an upper mold core, a lower mold core, and a shell. The upper mold core has a first convex molding surface. The lower mold core has a second convex molding surface opposite to the first convex molding surface. The shell has an upper portion and a lower portion for respectively accommodating the upper mold core and the lower mold core therein. The shell has an inner step support formed between the upper portion and the lower portion.

11 Claims, 3 Drawing Sheets

MOLD FOR MOLDING LENSES

BACKGROUND

1. Technical Field

The present invention relates to molds, and more particularly to a mold for molding lenses having two concave surfaces.

2. Description of the Related Art

Glass optical articles, such as aspheric lenses, ball-shaped lenses, and prisms, are generally made by a direct press-molding process using a mold The glass optical articles obtained by the direct press-molding method advantageously do not need to undergo further processing, such as a polishing process. Accordingly, the manufacture efficiency is greatly increased.

A typical mold for molding lenses comprises an upper mold core and a lower mold core. The upper mold core generally has a convex or concave molding surface. However, the lower mold core must have a concave molding surface. If the lower mold core has a convex molding surface, a preformed body that is generally gob-shaped or plate-shaped cannot be readily settled on the lower mold core. Therefore, the typical mold for molding lenses only can mold lenses having two convex surfaces or one convex surface and one concave surface. At least two lenses cooperate to obtain the function of one lens having two concave surfaces. Therefore, the structure of an optical system utilizing the cooperating lenses is complex.

What is needed, therefore, is a mold for molding lenses that can form lenses with two concave surfaces.

SUMMARY

In a preferred embodiment, a mold for molding lenses includes an upper mold core, a lower mold core, and a shell. The upper mold core has a first convex molding surface. The lower mold core has a second convex molding surface opposite to the first convex molding surface. The shell has an upper portion and a lower portion for respectively accommodating the upper mold core and the lower mold core therein. The shell has an inner step support formed between the upper portion and the lower portion.

Other advantages and novel features will become more apparent from the following detailed description of the present mold for molding lenses when taken in conjunction with the accompanying drawings.

BRIEF DESCRIPTION OF THE DRAWINGS

Many aspects of the mold for molding lenses can be better understood with reference to the following drawings. The components in the drawings are not necessarily drawn to scale, the emphasis instead being placed upon clearly illustrating the principles of the present invention. Moreover, in the drawings, like reference numerals designate corresponding parts throughout the several views.

DETAILED DESCRIPTION OF PREFERRED EMBODIMENT

Figure 1:
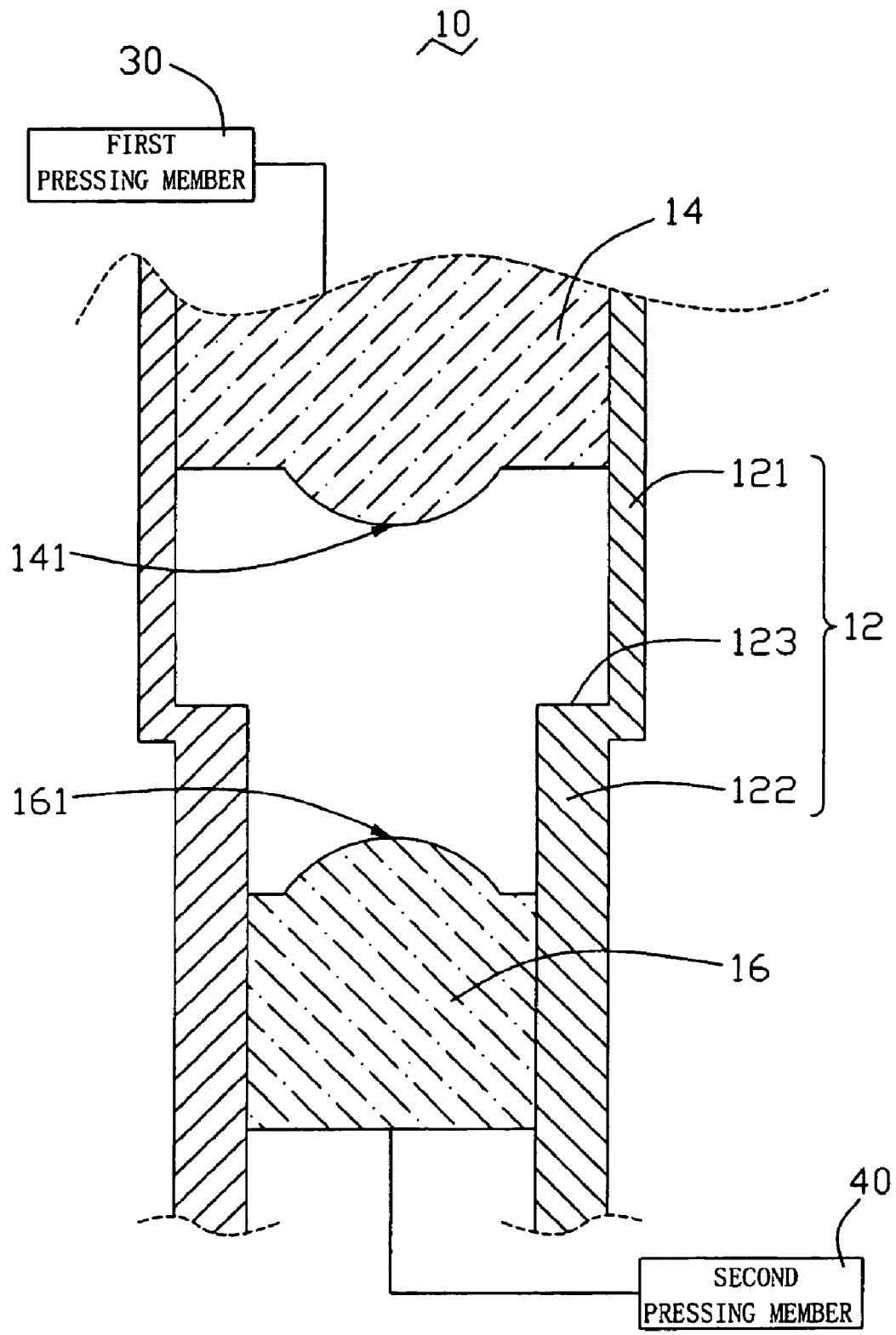
FIG. 1 is a schematic, axial cut-away view of a mold for molding lenses, in accordance with a preferred embodiment.

Reference will now be made to the drawing figures to describe the preferred embodiment of the present mold for molding lenses in detail.

Referring to FIG. 1, a mold 10 for molding lenses is shown in accordance with a preferred embodiment. The mold 10 includes an upper mold core 14, a lower mold core 16 corresponding to the upper mold core 14, and a shell 12 for accommodating the upper mold core 14 and the lower mold core 16.

Figure 2:
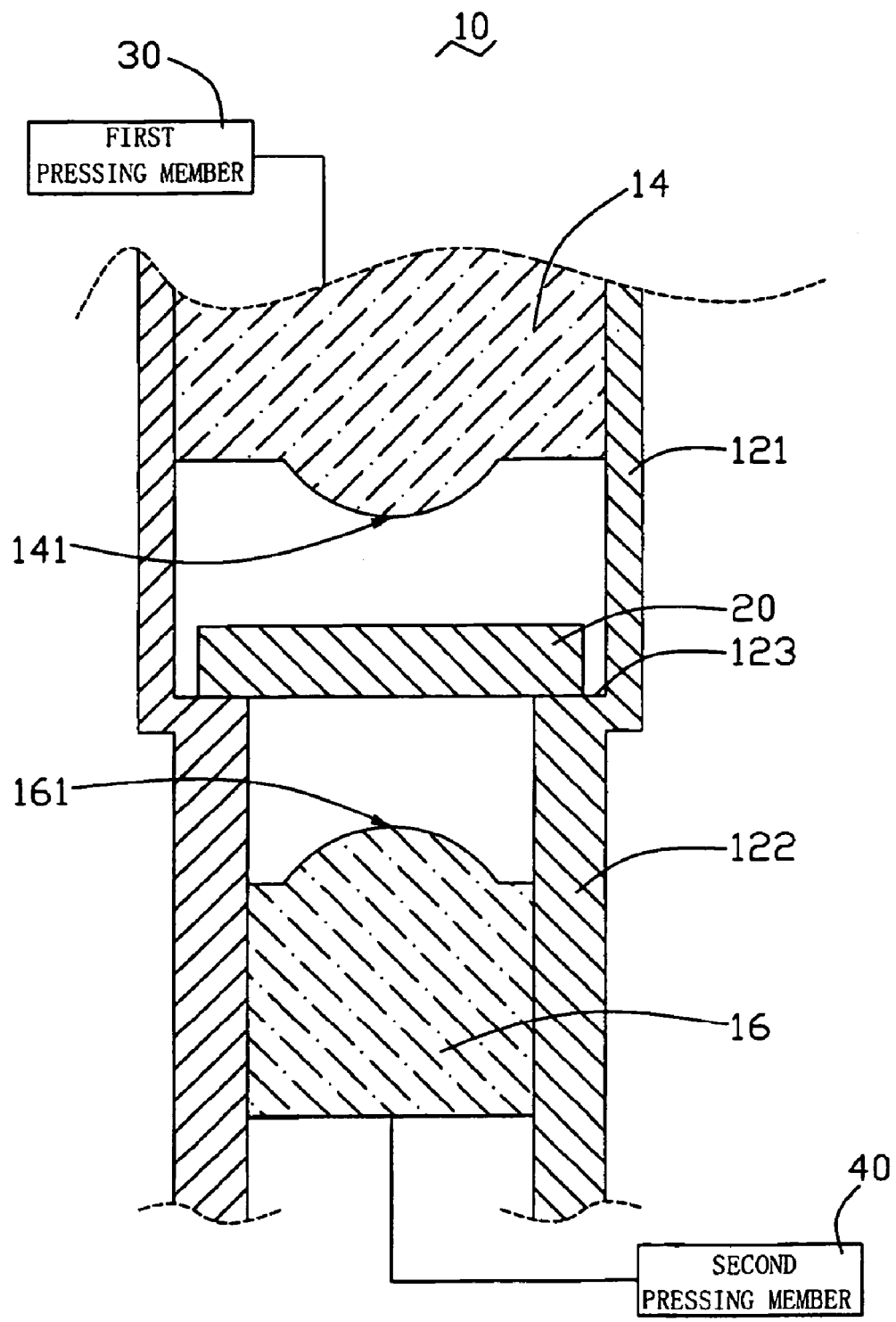
FIG. 2 is a schematic, axial cut-away view of the mold for molding lenses having a preformed body on the inner step support.
Figure 3:
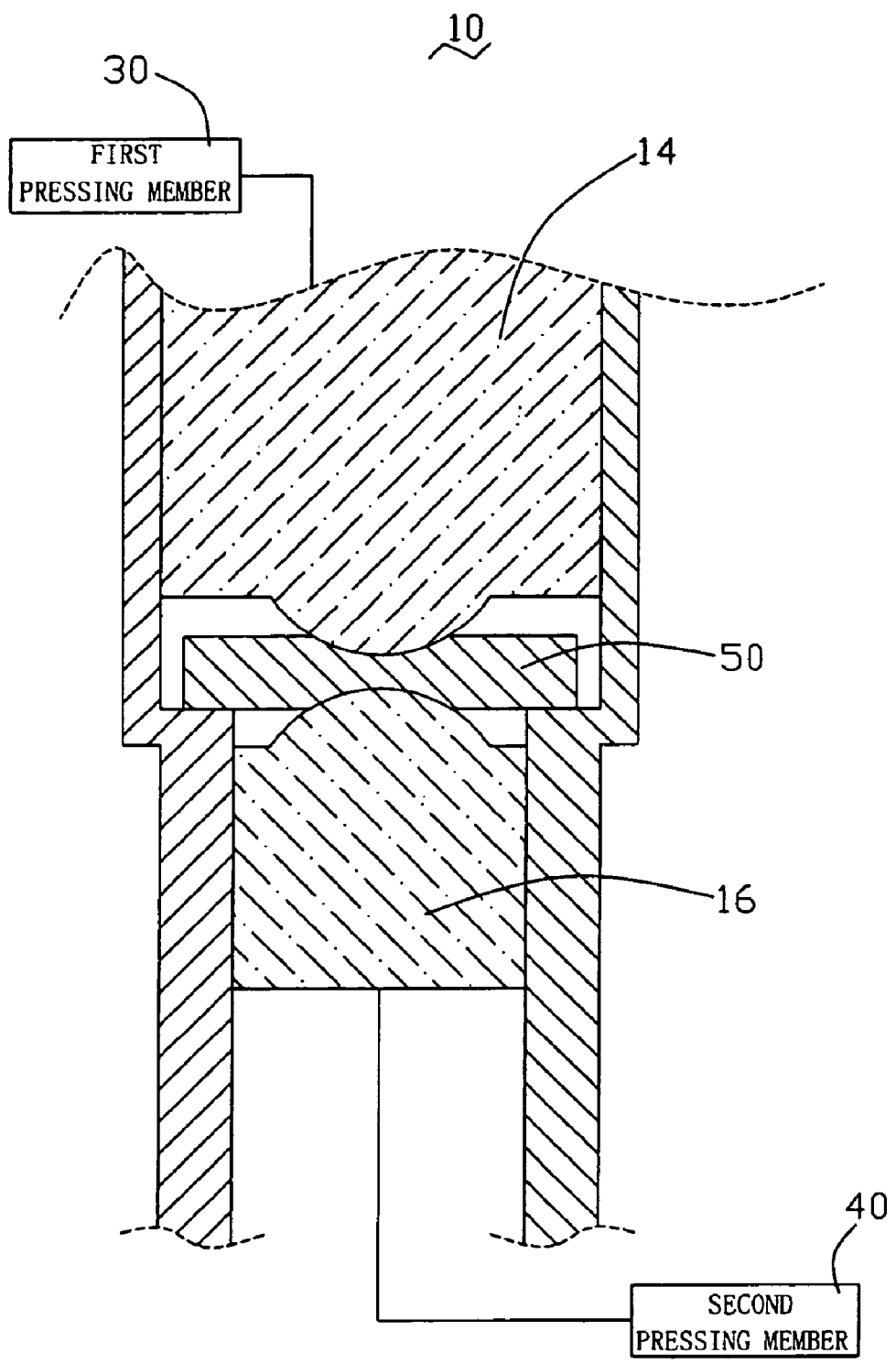
FIG. 3 is a schematic, axial cut-away view of the mold for molding lenses having a lens therein.

The shell 12 includes an upper portion 121 and a lower portion 122. The lower portion 122 is a cylinder being coaxially aligned with the upper portion 121. The inner diameter of the lower portion 122 is smaller than that of the upper portion 121. Thus, an inner step support 123 is formed at a joint between the upper portion 121 and the lower portion 122, and the upoer portion 121, the inner step support 123, and the lower portion 122, as seen from FIGS. 1-3, together unitarily constitute the shell 12. Therefore, the upper mold core 14 and the lower mold core 16 are located at opposite sides of the inner step support 123.

The inner diameter of the upper portion 121 can also be equal to that of the lower portion 122. The inside surface of the shell 12 extends radial to form the inner step support 123.

A wear-resistant and high-temperature film can be coated onto the inner surface of the shell 12, giving the shell 12 a smooth inner surface, wear-resistance and can high temperature resistance. The film can be made of titanium nitride (TiN).

The upper mold core 14 is a cylinder shape and is held in the upper portion 121 and can move up and down in the upper portion 121. A first convex molding surface 141 is formed on the bottom end of the upper mold core 14 near the inner step support 123. The upper mold core 14 is made of a super hard material, such as tungsten (W), tungsten carbide (WC), silicon carbide (SiC), silicon (Si), titanium oxide (TiC), boron carbide ($B_4C$), silicon nitride ($Si_3N_4$), titanium carbide (TiC), or an alloy made of tungsten carbide-cobalt (WC—Co).

The lower mold core 16 is held in the lower portion 122 and can move up and down in the lower portion 122. The lower mold core 16 is coaxial to the upper mold core 14. A second convex molding surface 161 is formed on the upper end of the lower mold core 16 near the inner step support 123. The lower mold core 16 is made of a super hard material, such as W, WC, SiC, Si, TiC, $B_4C$, $Si_3N_4$, TiC, or an alloy made of WC—Co.

A first pressing member 30 is connected to the upper mold core 14. The first pressing member 30 is utilized to move the upper mold core 14 up and down in the upper portion 121. The first pressing member 30 is either a piezoelectric driver or a linear motor. A second pressing member 40 is connected to the lower mold core 16. The second pressing member 40 is utilized to move the lower mold core 16 up and down in the lower portion 122. The second pressing member 40 is either a piezoelectric driver or a linear motor Referring to FIGS. 2 and 3, in operation, a preformed body 20 is placed on the inner step support 123. Then heating the body 20 to a predetermined temperature, the first pressing member 30 drives the upper mold core 14 to move downwards, and the second pressing member 40 drives the lower mold core 16 to move upwards. The first convex molding surface 141 and the second convex molding surface 161 each contact the body 20 thereby forming a lens 50 having two concave surfaces.

The first convex molding surface 141 and the second convex molding surface 161 could have different shaped convex surfaces, therefore giving the lens 50 have different shapes.

Although the present invention has been described with reference to specific embodiments, it should be noted that the described embodiments are not necessarily exclusive, and that various changes and modifications may be made to the described embodiments without departing from the scope of the invention as defined by the appended claims.

What is claimed is:

1. A mold for molding lenses, comprising:
   an upper mold core having a first convex molding surface;
   a lower mold core having a second convex molding surface opposite to the first convex molding surface; and
   a shell having an upper portion and a lower portion for respectively accommodating the upper mold core and the lower mold core therein, the shell having an inner step support formed at a joint between the upper portion and the lower portion, the upper portion, the inner step support, and the lower portion together unitarily constituting the shell.

2. The mold as claimed in claim 1, wherein at least one of the upper mold core and the lower mold core is movable in the shell.

3. The mold as claimed in claim 1, wherein the upper portion of the shell is coaxial to the lower portion of the shell, the inner diameter of the lower portion is smaller than that of the upper portion.

4. The mold as claimed in claim 1, wherein a material of the upper mold core is selected from a group consisting of tungsten, tungsten carbide, silicon carbide, silicon, titanium oxide, boron carbide, silicon nitride, titanium carbide, and alloy made of tungsten carbide and cobalt.

5. The mold as claimed in claim 1, wherein a material of the lower mold core is selected from a group consisting of tungsten, tungsten carbide, silicon carbide, silicon, titanium oxide, boron carbide, silicon nitride, titanium carbide, and alloy made of tungsten carbide and cobalt.

6. The mold as claimed in claim 1, wherein a wear-resistant and high-temperature film is coated on an inner surface of the shell.

7. The mold as claimed in claim 6, wherein the film is made of titanium nitride.

8. The mold as claimed in claim 1, further comprising a first pressing member configured for pressing the upper mold core toward the lower mold core.

9. The mold as claimed in claim 8, wherein the first pressing member is one of a piezoelectric driver and a linear motor.

10. The mold as claimed in claim 1, further comprising a second pressing member configured for pressing the lower mold core toward the upper mold core.

11. The mold as claimed in claim 10, wherein the second pressing member is one of a piezoelectric driver and a linear motor.

* * * * *